United States Patent
Saitou et al.

(10) Patent No.: US 7,683,769 B2
(45) Date of Patent: Mar. 23, 2010

(54) BATTERYLESS TIRE INFLATION PRESSURE DETECTING APPARATUS HAVING MINIMUM INFLUENCE ON ENVIRONMENT

(75) Inventors: Takashi Saitou, Okazaki (JP); Akira Takaoka, Okazaki (JP); Nobuya Watabe, Nagoya (JP); Hideki Saito, Anjo (JP); Tomohiro Kuno, Nagoya (JP)

(73) Assignees: Denso Corporation, Kariya, Aichi-Pref. (JP); Nippon Soken, Inc., Nishio, Aichi-Pref. (JP)

( * ) Notice: Subject to any disclaimer, the term of this patent is extended or adjusted under 35 U.S.C. 154(b) by 445 days.

(21) Appl. No.: 11/723,757

(22) Filed: Mar. 21, 2007

(65) Prior Publication Data
US 2007/0222571 A1    Sep. 27, 2007

(30) Foreign Application Priority Data
Mar. 22, 2006    (JP)    ............................ 2006-078812

(51) Int. Cl.
    *B60C 23/00*    (2006.01)
(52) U.S. Cl. ...................... 340/445; 73/146.5; 340/447
(58) Field of Classification Search ......... 340/442–447; 455/63.1, 107; 73/146–146.5
See application file for complete search history.

(56) References Cited

U.S. PATENT DOCUMENTS

| | | | | |
|---|---|---|---|---|
| 4,609,905 A | * | 9/1986 | Uzzo | .......................... 340/447 |
| 5,289,160 A | * | 2/1994 | Fiorletta | ...................... 340/447 |
| 5,774,047 A | * | 6/1998 | Hensel, IV | .................... 340/442 |
| 6,877,370 B2 | * | 4/2005 | Masudaya | ..................... 73/146 |
| 7,104,438 B2 | * | 9/2006 | Benedict | ...................... 235/375 |
| 7,131,323 B2 | * | 11/2006 | Hirota | .......................... 73/146 |
| 2005/0245210 A1 | * | 11/2005 | Hyunh et al. | ............... 455/107 |
| 2005/0280523 A1 | | 12/2005 | Watabe | |

FOREIGN PATENT DOCUMENTS

| | | |
|---|---|---|
| JP | 2005-170274 | 6/2005 |
| JP | 2006-021746 | 1/2006 |

* cited by examiner

*Primary Examiner*—Brent Swarthout
(74) *Attorney, Agent, or Firm*—Nixon & Vanderhye PC

(57) ABSTRACT

A batteryless tire inflation pressure detecting apparatus includes, on the body of a vehicle, antennas and a transmitter transmitting radio waves through the antennas. The apparatus also includes, on each wheel of the vehicle, a pressure sensor sensing the pressure of a tire, a transceiver, and a charging unit powering the pressure sensor and the transceiver. The charging unit is charged with electric power induced by a corresponding one of the radio waves received by the transceiver. The apparatus further includes, on the body of the vehicle, a receiver receiving pressure signals transmitted by the transceivers, a pressure determiner determining the pressures of the tires based on the pressure signals, and a controller. To minimize influence of the radio waves on neighboring devices, the controller controls the transmitter so that least two of the radio waves are transmitted at different times, or at the same with a phase difference therebetween.

13 Claims, 11 Drawing Sheets

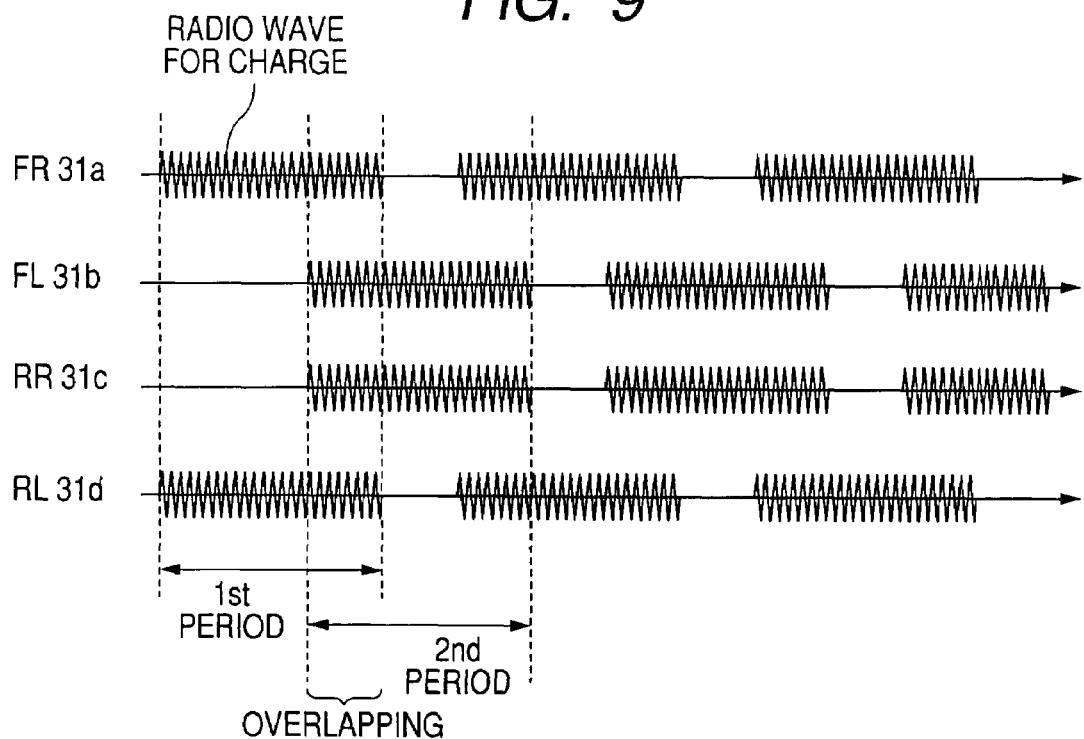
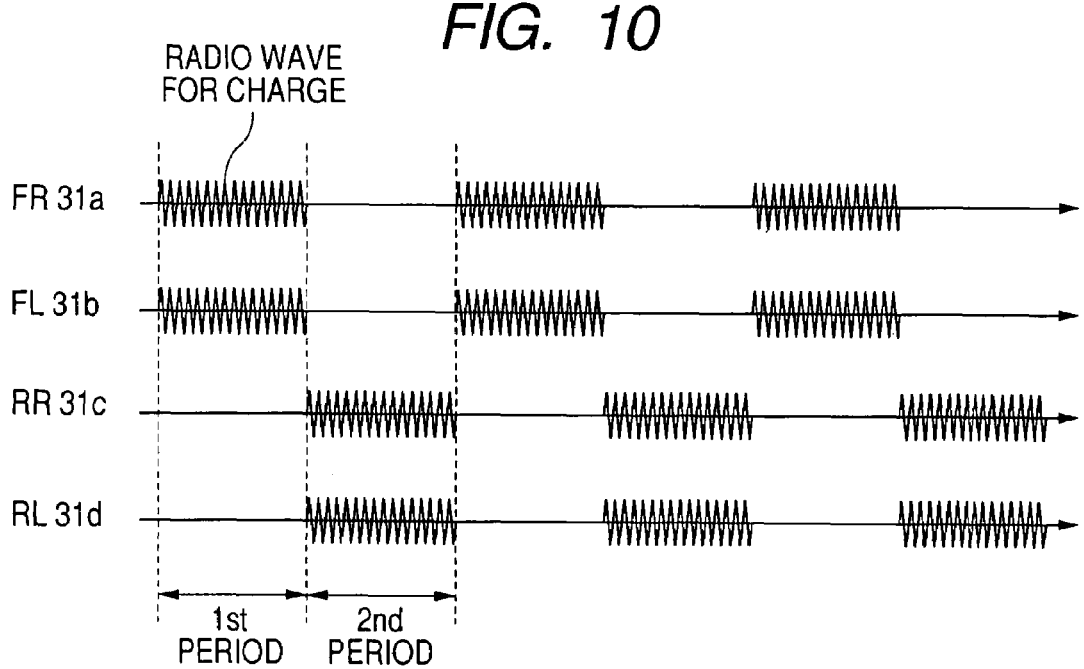

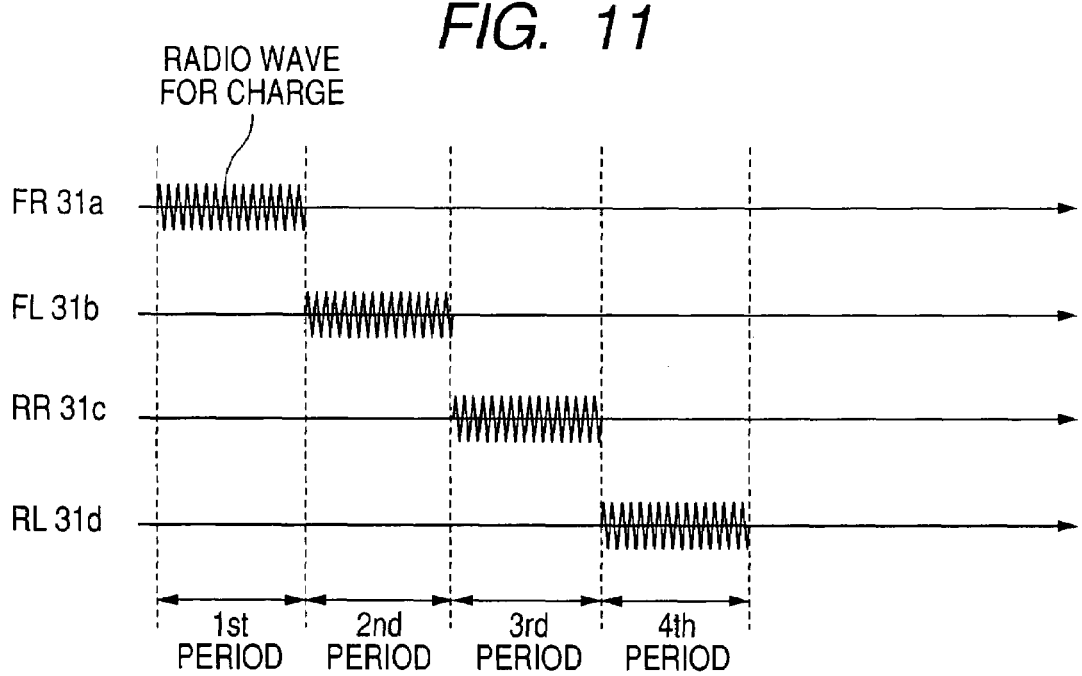
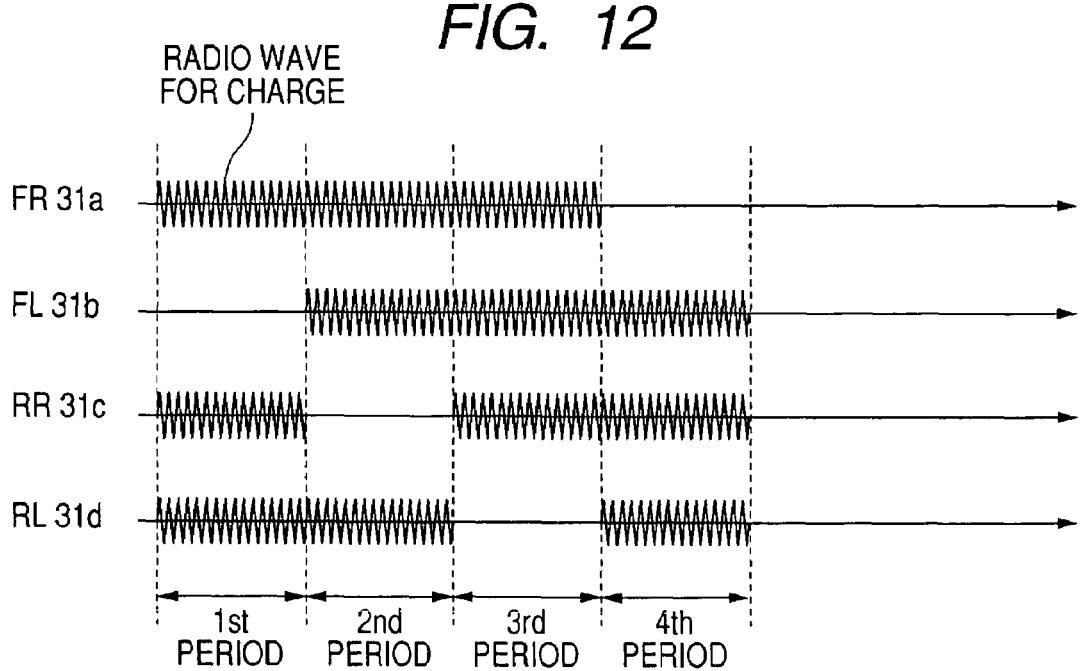

BATTERYLESS TIRE INFLATION PRESSURE DETECTING APPARATUS HAVING MINIMUM INFLUENCE ON ENVIRONMENT

CROSS-REFERENCE TO RELATED APPLICATION

This application is based on and claims priority from Japanese Patent Application No. 2006-78812, filed on Mar. 22, 2006, the content of which is hereby incorporated by reference into this application.

BACKGROUND OF THE INVENTION

1. Technical Field of the Invention

The present invention relates generally to tire inflation pressure detecting apparatuses and wireless electric power charging systems. More particularly, the invention relates to a batteryless, direct-type tire inflation pressure detecting apparatus for a vehicle which is based on a transponder method and has minimum influence on electric or electronic devices provided on the vehicle.

2. Description of the Related Art

A conventional direct-type tire inflation pressure detecting apparatus includes at least a transmitter and a receiver.

The transmitter is directly installed to a wheel of a vehicle and includes a pressure sensor working to sense inflation pressure of a tire fitted on the wheel. The transmitter is configured to transmit a pressure signal indicative of the inflation pressure of the tire sensed by the pressure sensor.

The receiver is installed to the body of the vehicle and includes an antenna. The receiver is configured to receive, through the antenna, the pressure signal transmitted by the transmitter and determine the inflation pressure of the tire based on the received pressure signal.

In the above arrangement, the transmitter is conventionally supplied with electric power by a battery provided on the wheel of the vehicle. On the other hand, developments have recently been made to supply electric power to the transmitter without using a battery.

For example, U.S. Patent Application Publication No. 2005-0280523 discloses a batteryless tire inflation, pressure detecting apparatus which is based on a transponder method.

According to the transponder method, the receiver (i.e., the interrogator) works to transmit, through the antenna thereof, a radio wave for electric power charge to the transmitter, thereby charging a charging unit of the transmitter (i.e., the transponder) with electric power. When the charging unit is completely charged with electric power, the transmitter is then activated by the charged electric power to transmit the pressure signal to the receiver.

However, in such a batteryless tire inflation pressure detecting apparatus, the radio wave for electric power charge is generally transmitted at a high strength close to the upper limit of a permissible strength range specified under regulations.

Further, such a batteryless tire inflation pressure detecting apparatus generally includes more than one transmitter, and thus the receiver transmits more than one radio wave for respectively charging the charging units of the transmitters.

Accordingly, when the radio waves for electric power charge reach and intersect in an area where automotive electric or electronic devices, such as a radio, an ECU, and a keyless entry system, are provided, they may produce strong noises that influence those devices. Particularly, when the radio waves for electric power charge are transmitted at a frequency in the LF band, the influence thereof on the automotive devices may be very large.

SUMMARY OF THE INVENTION

The present invention has been made in view of the above-mentioned problems.

It is, therefore, a primary object of the present invention to provide a batteryless, direct-type tire inflation pressure detecting apparatus for a vehicle which has minimum influence on electric or electronic devices provided on the vehicle.

It is a further object of the present invention to provide a wireless electric power charging system for a vehicle which has minimum influence on electric or electronic devices provided on the vehicle.

According to a first aspect of the present invention, there is provided a tire inflation pressure detecting apparatus which includes:

a plurality of antennas each of which is provided on a body of a vehicle at a predetermined distance from a corresponding one of a plurality of wheels of the vehicle;

a transmitter provided on the body of the vehicle and working to transmit a plurality of radio waves respectively through corresponding ones of the antennas;

a plurality of pressure sensors each of which is provided on a corresponding one of the wheels of the vehicle and works to sense inflation pressure of a tire fitted on the corresponding wheel;

a plurality of transceivers each of which is provided on a corresponding one of the wheels of the vehicle in connection with a corresponding one of the pressure sensors on the corresponding wheel, each of the transceivers working to receive a corresponding one of the radio waves transmitted through the corresponding antenna and transmit a pressure signal indicative of the inflation pressure sensed by the corresponding pressure sensor;

a plurality of charging units each of which is provided on a corresponding one of the wheels of the vehicle in connection with a corresponding one of the transceivers on the corresponding wheel, each of the charging units being configured to be charged with electric power, which is induced by the corresponding radio wave received by the corresponding transceiver, and supply the electric power to the corresponding pressure sensor and transceiver;

a receiver provided on the body of the vehicle and working to receive, through the corresponding antennas, the pressure signals transmitted by the transceivers;

a pressure determiner provided on the body of the vehicle in connection with the receiver, the pressure determiner working to determine the inflation pressures of the tires based on the corresponding pressure signals received by the receiver; and a controller provided on the body of the vehicle and working to control the transmitter to transmit the radio waves through the corresponding antennas, wherein at least two of the radio waves are transmitted at different times, so as to minimize interference therebetween.

With the above configuration, it is possible to reduce the possibility of the radio waves exerting undesirable influences on electric or electronic devices provided on the vehicle.

Preferably, the at least two radio waves are transmitted for different non-overlapping time periods.

It is further preferable that there is a time interval between the non-overlapping time periods.

Two of the radio waves may be transmitted at different times through the corresponding antennas, the distance between which is preferably minimum among all the distances between the antennas.

The wheels of the vehicle may include a front-right wheel, a front-left wheel, a rear-right wheel, and a rear-left wheel. In this case, preferably, any pair of the radio waves, which are transmitted respectively through a pair of the antennas corresponding to a pair of the wheels having the same front/rear position, are transmitted at different times; further, any pair of the radio waves, which are transmitted respectively through a pair of the antennas corresponding to a pair of the wheels having the same right/left, are transmitted at different times.

Preferably, the controller controls the transmitter to transmit each of the radio waves through the corresponding antenna when no radio wave is received by the corresponding antenna.

Preferably, in the tire inflation pressure detecting apparatus, at least one pair of the radio waves are transmitted at the same time with such a phase difference therebetween that when the pair of the radio waves intersect, strength of a resultant wave thereof is lower than both strengths of the pair of the radio waves.

The corresponding pressure sensor, transceiver, and charging unit on each of the wheels of the vehicle may be integrated into a single device; further, the transmitter, receiver, pressure determiner, and controller on the body of the vehicle may be integrated into a single device.

According to a second aspect of the present invention, there is provided another tire inflation pressure detecting apparatus which includes:

a plurality of antennas each of which is provided on a body of a vehicle at a predetermined distance from a corresponding one of a plurality of wheels of the vehicle;

a transmitter provided on the body of the vehicle and working to transmit a plurality of radio waves respectively through corresponding ones of the antennas;

a plurality of pressure sensors each of which is provided on a corresponding one of the wheels of the vehicle and works to sense inflation pressure of a tire fitted on the corresponding wheel;

a plurality of transceivers each of which is provided on a corresponding one of the wheels of the vehicle in connection with a corresponding one of the pressure sensors on the corresponding wheel, each of the transceivers working to receive a corresponding one of the radio waves transmitted through the corresponding antenna and transmit a pressure signal indicative of the inflation pressure sensed by the corresponding pressure sensor;

a plurality of charging units each of which is provided on a corresponding one of the wheels of the vehicle in connection with a corresponding one of the transceivers on the corresponding wheel, each of the charging units being configured to be charged with electric power, which is induced by the corresponding radio wave received by the corresponding transceiver, and supply the electric power to the corresponding pressure sensor and transceiver;

a receiver provided on the body of the vehicle and working to receive, through the corresponding antennas, the pressure signals transmitted by the transceivers;

a pressure determiner provided on the body of the vehicle in connection with the receiver, the pressure determiner working to determine the inflation pressures of the tires based on the corresponding pressure signals received by the receiver; and a controller provided on the body of the vehicle and working to control the transmitter to transmit the radio waves through the corresponding antennas, wherein at least one pair of the radio waves are transmitted at the same time with such a phase difference therebetween that when the pair of the radio waves intersect, strength of a resultant wave thereof is lower than both strengths of the pair of the radio waves.

With the above configuration, it is also possible to reduce the possibility of the radio waves exerting undesirable influences on electric or electronic devices provided on the vehicle.

Preferably, the phase difference between the pair of the radio waves is in a range of ($1/2\lambda$, $3/4\lambda$), where $\lambda$ is a length of the radio waves.

The wheels of the vehicle may include a front-right wheel, a front-left wheel, a rear-right wheel, and a rear-left wheel. In this case, preferably, any pair of the radio waves, which are transmitted respectively through a pair of the antennas corresponding to a pair of the wheels having the same front/rear position, are opposite in phase to each other; further, any pair of the radio waves, which are transmitted respectively through a pair of the antennas corresponding to a pair of the wheels having the same right/left position, are opposite in phase to each other.

According to a third aspect of the present invention, there is provided a wireless electric power charging system for use in a vehicle, which includes:

a first and a second antenna which are provided on a body of a vehicle at a predetermined distance respectively from a first and a second wheel of the vehicle;

a transmitter provided on the body of the vehicle and working to transmit a first and a second radio wave respectively through the first and second antennas;

a first and a second receiver which are respectively provided on the first and second wheels of the vehicle and work to receive the first and second radio waves respectively;

a first and a second charging unit which are respectively provided on the first and second wheels of the vehicle and configured to be charged with a first and a second electric power respectively, the first and second electric powers being respectively induced by the first and second radio waves received by the first and second receivers; and a controller controlling the transmitter to transmit the first and second radio waves at different times, so as to minimize interference between the first and second radio waves.

With the above configuration, it is possible to reduce the possibility of the first and second radio waves exerting undesirable influences on electric or electronic devices provided on the vehicle.

According to a fourth aspect of the present invention, there is provided another wireless electric power charging system for use in a vehicle, which includes:

a first and a second antenna which are provided on a body of a vehicle at a predetermined distance respectively from a first and a second wheel of the vehicle;

a transmitter provided on the body of the vehicle and working to transmit a first and a second radio wave respectively through the first and second antennas;

a first and a second receiver which are respectively provided on the first and second wheels of the vehicle and work to receive the first and second radio waves respectively;

a first and a second charging unit which are respectively provided on the first and second wheels of the vehicle and configured to be charged with a first and a second electric power respectively, the first and second electric powers being respectively induced by the first and second radio waves received by the first and second receivers; and a controller controlling the transmitter to transmit the first and second radio waves with such a phase difference therebetween that when the first and second radio waves intersect, strength of a resultant wave of the first and second radio waves is lower than both strengths of the first and second radio waves.

With the above configuration, it is also possible to reduce the possibility of the first and second radio waves exerting undesirable influences on electric or electronic devices provided on the vehicle.

BRIEF DESCRIPTION OF THE DRAWINGS

The present invention will be understood more fully from the detailed description given hereinafter and from the accompanying drawings of the preferred embodiments of the invention, which, however, should not be taken to limit the invention to the specific embodiments but are for the purpose of explanation and understanding only.

In the accompanying drawings:

FIG. 9 is a time chart illustrating a control of transmission of the radio waves according to the third embodiment of the invention;

FIG. 10 is a time chart illustrating a control of transmission of the radio waves according to the fourth embodiment of the invention;

FIG. 11 is a time chart illustrating a control of transmission of the radio waves according to the fifth embodiment of the invention;

FIG. 12 is a time chart illustrating a control of transmission of the radio waves according to the sixth embodiment of the invention;

DESCRIPTION OF THE PREFERRED EMBODIMENTS

Figure 1:
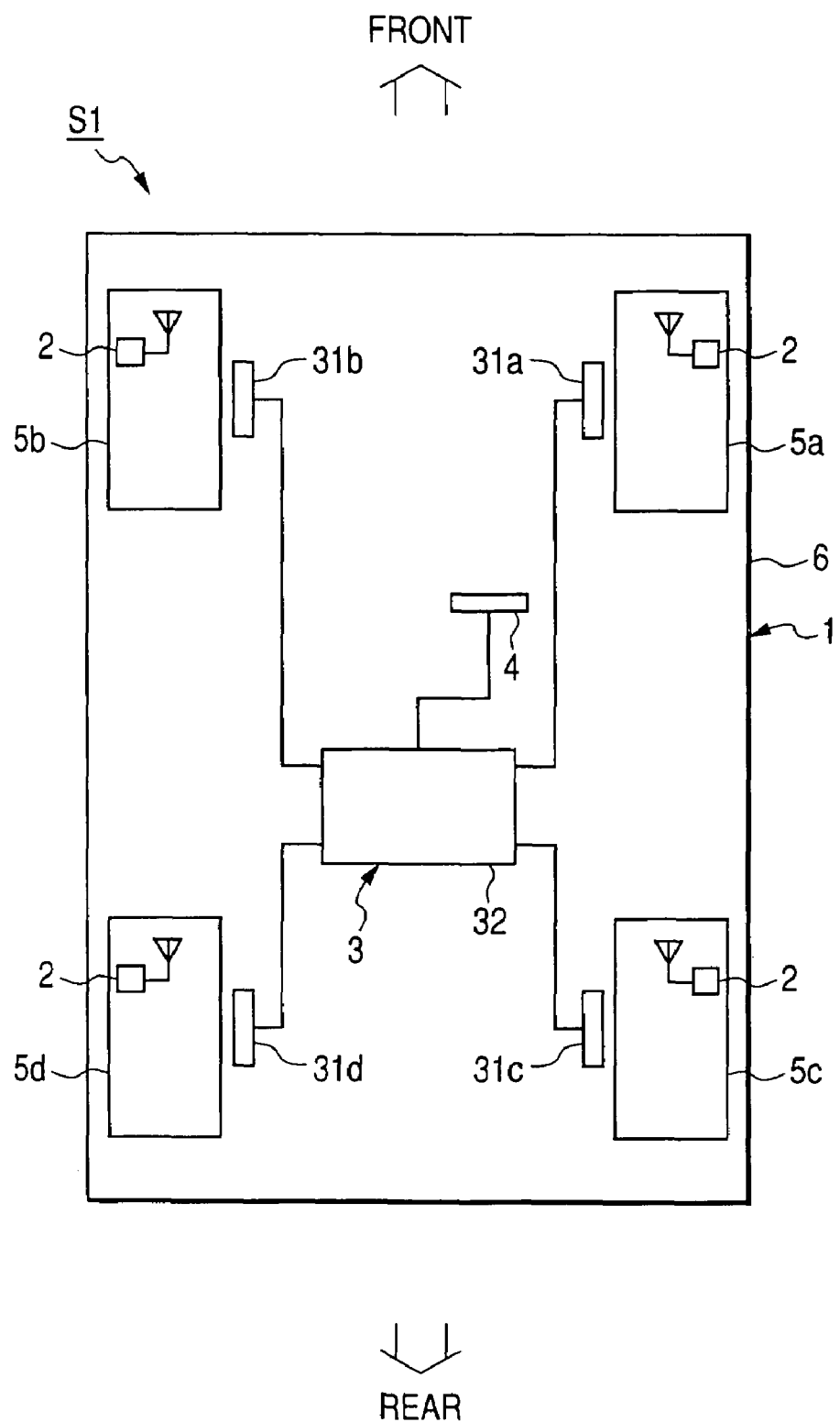
FIG. 1 is a schematic view showing the overall configuration of a tire inflation pressure detecting apparatus according to the first embodiment of the invention.

The preferred embodiments of the present invention will be described hereinafter with reference to FIGS. 1-16.

It should be noted that, for the sake of clarity and understanding, identical components having identical functions in different embodiments of the invention have been marked, where possible, with the same reference numerals in each of the figures.

First Embodiment

FIG. 1 shows the overall configuration of a batteryless, direct-type tire inflation pressure detecting apparatus S1 according to the first embodiment of the invention.

The tire inflation pressure detecting apparatus S1 is installed to a vehicle 1 which includes four wheels 5a-5d (i.e., the FR wheel 5a, the FL wheel 5b, the RR wheel 5c, and the RL wheel 5d).

As shown in FIG. 1, the tire inflation pressure detecting apparatus S1 includes four wheel-side transceivers 2, a body-side transceiver 3, and a warning device 4.

Figure 2:
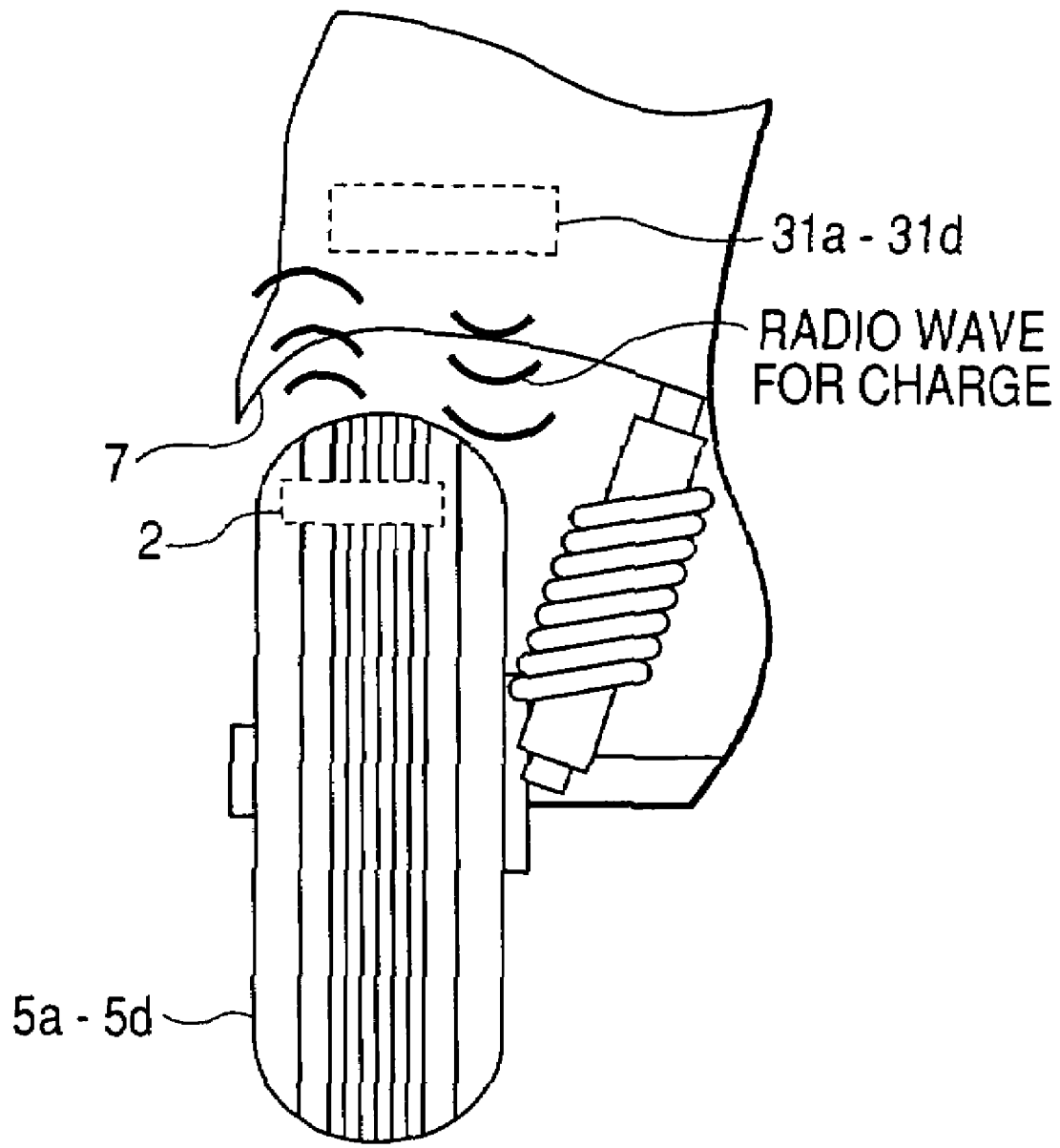
FIG. 2 is a schematic view illustrating the relative position between a wheel-side transceiver and a corresponding body-side antenna of the tire inflation pressure detecting apparatus on a vehicle.

Referring further to FIG. 2, each of the wheel-side transceivers 2 is mounted on a corresponding one of the four wheels 5a-5d of the vehicle 1, so as to have association with a tire fitted on the corresponding wheel.

Each of the wheel-side transceivers 2 works to sense the inflation pressure of the associated tire and transmit a frame that contains tire pressure information indicative of the sensed inflation pressure of the associated tire.

Further, according to the previously described transponder method, each of the wheel-side transceivers 2 is configured to be charged with electric power via a radio wave transmitted by the body-side transceiver 3 and be activated by the charged electric power.

On the other hand, the body-side transceiver 3 is mounted on the body 6 of the vehicle 1, as shown in FIG. 1. The body-side transceiver 3 includes four antennas 31a-31d and a microcomputer 32.

Each of the antennas 31a-31d is arranged on the body 6 of the vehicle 1 in the vicinity of a corresponding one of the wheels 5a-5d at a predetermined distance from the axis of the corresponding wheel. As shown in FIG. 2, in the present embodiment, each of the antennas 31a-31d is fixed to a corresponding one of fenders 7 of the vehicle 1.

As illustrated in FIG. 2, the body-side transceiver 3 works to transmit the radio waves for electric power charge to the wheel-side transceivers 2 via the corresponding antennas 31a-31d, receive frames transmitted by the wheel-side transceivers 2 via the corresponding antennas 31a-31d, and determine the inflation pressures of the four tires based on the tire pressure information contained in the corresponding frames.

Figure 3A:
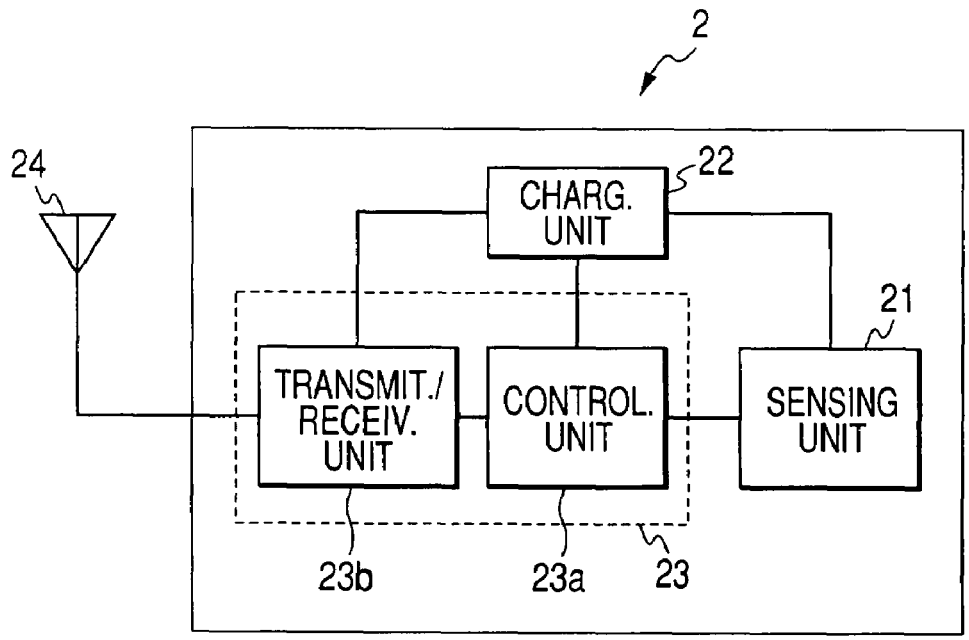
FIG. 3A is a functional block diagram showing the configuration of each of wheel-side transceivers of the tire inflation pressure detecting apparatus.

FIG. 3A shows the configuration of each of the wheel-side transceivers 2.

As shown in FIG. 3A, each of the wheel-side transceivers 2 includes a sensing unit 21, a charging unit 22, a microcomputer 23, and an antenna 24.

The sensing unit 21 is configured with sensors, such as a diaphragm-type pressure sensor and a temperature sensor, and works to output signals representative of the sensed inflation pressure of the tire and the sensed temperature of air within the tire.

The charging unit 22 is configured to be charged with electric power, which is induced by the radio wave for electric power charge received through the antenna 24, and supply the electric power to the sensing unit 21 and the microcomputer 23. The charging unit 22 may be made up of a capacitor.

The use of wireless electric power charging systems based on a transponder method is well known in the art, particularly in the field of wireless ID tags; therefore, more details thereabout are omitted hereinafter.

The microcomputer 23 is of a well-known type, which is configured with a CPU (Central Processing Unit), a ROM (READ Only Memory), a RAM (Random Access Memory), and I/O (Input/Output) devices.

The microcomputer 23 functionally includes a controlling unit 23a and a transmitting/receiving unit 23b, which are realized by a program installed in the ROM when the program is activated. The two units 23a and 23b are configured to implement predetermined processes in accordance with the program.

Specifically, the controlling unit 23a receives the signals output from the sensing unit 21 and processes those signals as needed. Then, the controlling unit 23a assembles the frame, which contains the tire pressure information indicative of the inflation pressure of the tire sensed by the sensing unit 21 and ID information indicative of the identity of the wheel-side transceiver 2, and provides the frame to the transmitting/receiving unit 23b.

The transmitting/receiving unit 23b receives the radio wave for electric power charge through the antenna 24 and provides the received radio wave to the charging unit 22 and the controlling unit 23a. Further, the transmitting/receiving unit 23b also receives the frame provided by the controlling unit 23a and transmits the frame to the body-side transceiver 3 through the antenna 24.

In the present embodiment, the process of transmitting the frame to the body-side transceiver 3 is started, in accordance with the program, when the charging unit 22 has been charged with an amount of electric power sufficient for transmission of the frame. Further, the process of transmitting the frame is repeatedly performed at predetermined time intervals (e.g., 1 minute).

The above-described wheel-side transceivers 2 are each fixed to an air valve of the corresponding one of the wheels 5a-5d and at least the sensing unit 21 thereof is arranged to be exposed to the air within the tire.

Figure 3B:
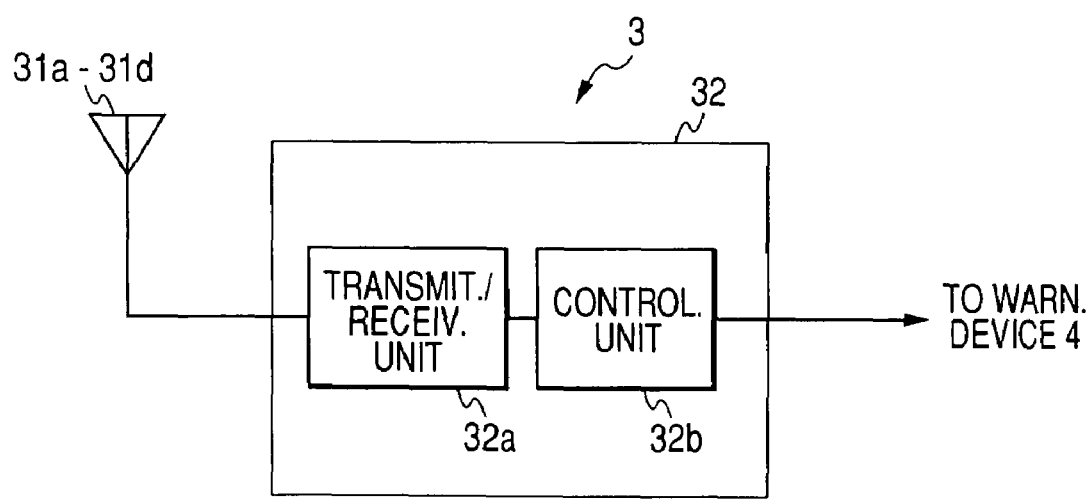
FIG. 3B is a functional block diagram showing the configuration of a body-side transceiver of the tire inflation pressure detecting apparatus.

FIG. 3B shows the configuration of the body-side transceiver 3. As mentioned above, the body-side transceiver 3 includes the four antennas 31a-31d and the microcomputer 32.

In the present embodiment, each of the antennas 31a-31d functions as both a transmitting antenna for transmitting the radio wave for electric power charge to the corresponding wheel-side transceiver 2 and a receiving antenna for receiving the frame from the corresponding wheel-side transceiver 2.

The microcomputer 32 is of a well-known type, which is configured with a CPU, a ROM, a RAM, and I/O devices.

The microcomputer 32 functionally includes a transmitting/receiving unit 32a and a controlling unit 32b, which are realized by a program installed in the ROM of the microcomputer 32 when the program is activated. The two units 32a and 32b are configured to implement predetermined processes in accordance with the program.

Specifically, the transmitting/receiving unit 32a receives the radio waves for electric power charge from the controlling unit 32b and transmits the radio waves to the wheel-side transceivers 2 via the corresponding antennas 31a-31d.

The transmitting/receiving unit 32a also receives the frames from the wheel-side transceivers 2 via the corresponding antennas 31a-31d and provides the frames to the controlling unit 32b.

The controlling unit 32b controls, as to be described in detail later, the transmitting/receiving unit 32a to transmit the radio waves for electric power charge at suitable times.

Further, the controlling unit 32b receives the frames provided by the transmitting/receiving unit 32a, and determines the inflation pressures of the four tires based on the tire pressure information contained in the corresponding frames. Then, the controlling unit 32b compares each of the determined inflation pressures of the tires with a predefined threshold and outputs a warning signal to the warning device 4 if it is lower than the predefined threshold.

The warning device 4 is, as illustrated in FIG. 1, electrically connected to the body-side transceiver 3 and arranged in a location visible for the driver of the vehicle 1. The warning device 4 is configured with, for example, a warning display on the instrument panel of the vehicle 1. The warning device 4 works to inform, in response to receipt of the warning signal from the body-side transceiver 3, the driver of a decrease in the inflation pressure of one of the tires.

After having described the overall configuration of the tire inflation pressure detecting apparatus S1, a control of transmission of the radio waves by the controlling unit 32b of the body-side transceiver 3 will be described hereinafter.

Figure 4:
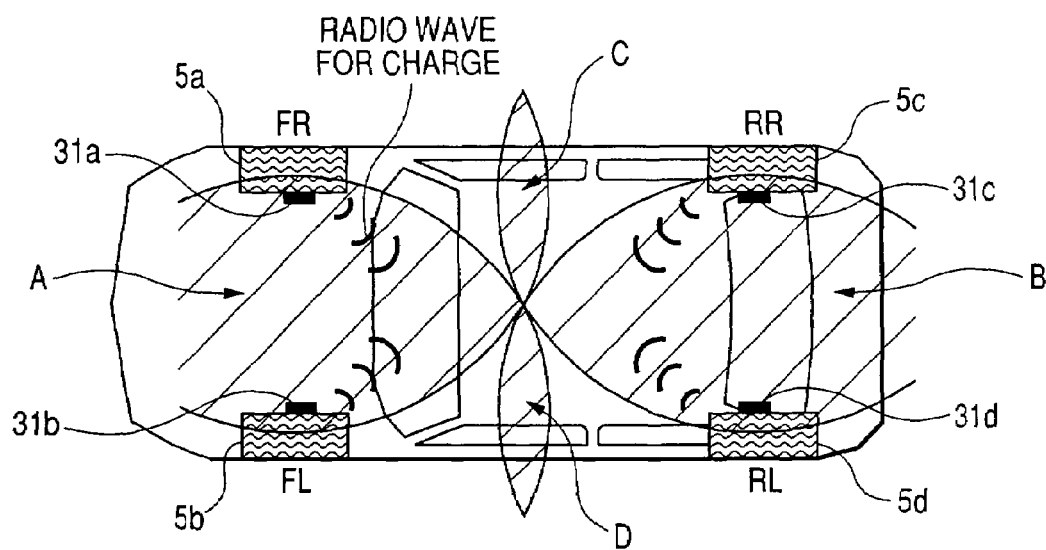
FIG. 4 is a schematic view illustrating transmission rages of radio waves transmitted by the body-side transceiver through corresponding body-side antennas.

Referring to FIG. 4, in the present embodiment, the radio waves for electric power charge are transmitted at such a predetermined strength that there are four areas A, B, C, and D in each of which two of the radio waves transmitted through the antennas 31a-31d may intersect. Those areas A-D are hatched in FIG. 4.

More specifically, in the area A, the two radio waves transmitted respectively through the antennas 31a and 31b may intersect; in the area B, the two radio waves transmitted respectively through the antennas 31c and 31d may intersect; in the area C, the two radio waves transmitted respectively through the antennas 31a and 31c may intersect; and in the area D, the two radio waves transmitted respectively through the antennas 31b and 31d may intersect. However, there is no area in which the two radio waves transmitted respectively through the diagonally disposed antennas 31a and 31d may intersect. Similarly, there is also no area in which the two radio waves transmitted respectively through the diagonally disposed antennas 31b and 31c may intersect. In other words, at the center of the vehicle 1, there is no pair of the radio wave intersecting.

In the above case, when the two radio waves passing through the front-side antennas 31a and 31b are transmitted at the same time, at the same frequency, and in the same phase, the two radio waves will intersect in the area A, thereby producing a resultant wave whose strength is double those of the two radio waves. Accordingly, if there are disposed in the area A automotive electrical or electronic devices, such as receiving antennas of an automotive radio and a keyless entry system, the resultant wave will exert, as a strong noise, undesirable influence on those automotive devices.

Similarly, in the other areas B-D, when the above-described pairs of the radio waves intersect, the resultant waves may exert, as strong noises, undesirable influences on automotive devices disposed on those areas.

Accordingly, in the present embodiment, the controlling unit 32b of the body-side transceiver 3 controls transmission of the radio waves so as to minimize interferences therebetween.

Figure 5:
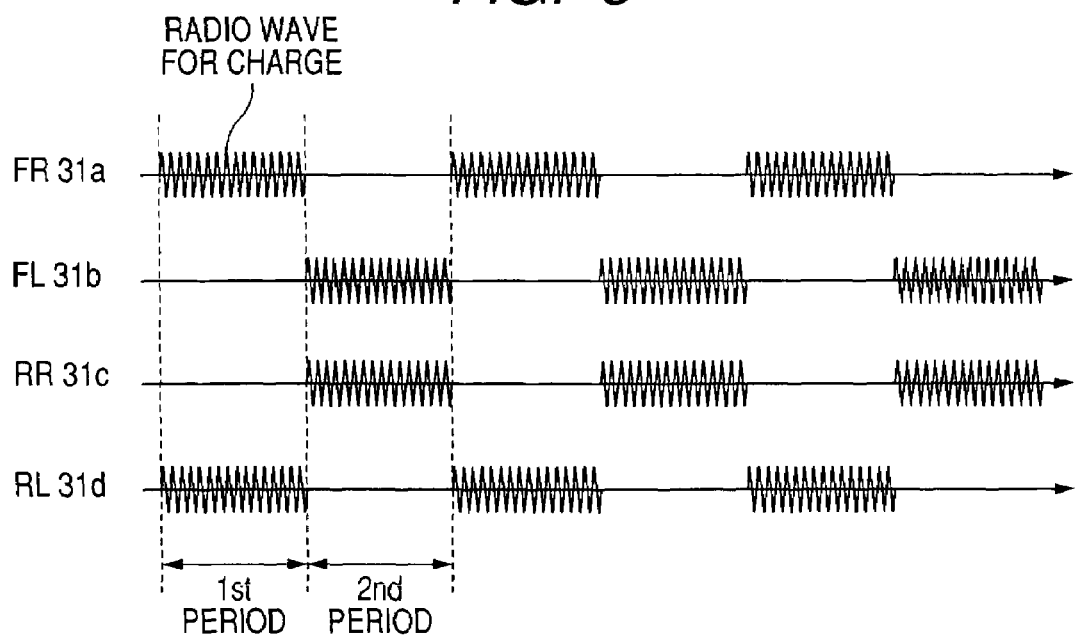
FIG. 5 is a time chart illustrating a control of transmission of the radio waves according to the first embodiment of the invention.

Specifically, referring to FIG. 5, in the present embodiment, each of the radio waves for electric power charge is periodically transmitted. Further, for each of the radio waves, the length of "ON" periods during which the radio wave is transmitted is equal to that of "OFF" periods during which transmission of the radio wave is stopped. Furthermore, the lengths of the ON and OFF periods are the same for all of the radio waves. However, the arrangement of ON and OFF periods of each of the radio waves is identical to that of only one of the other radio waves.

Figure 6A:
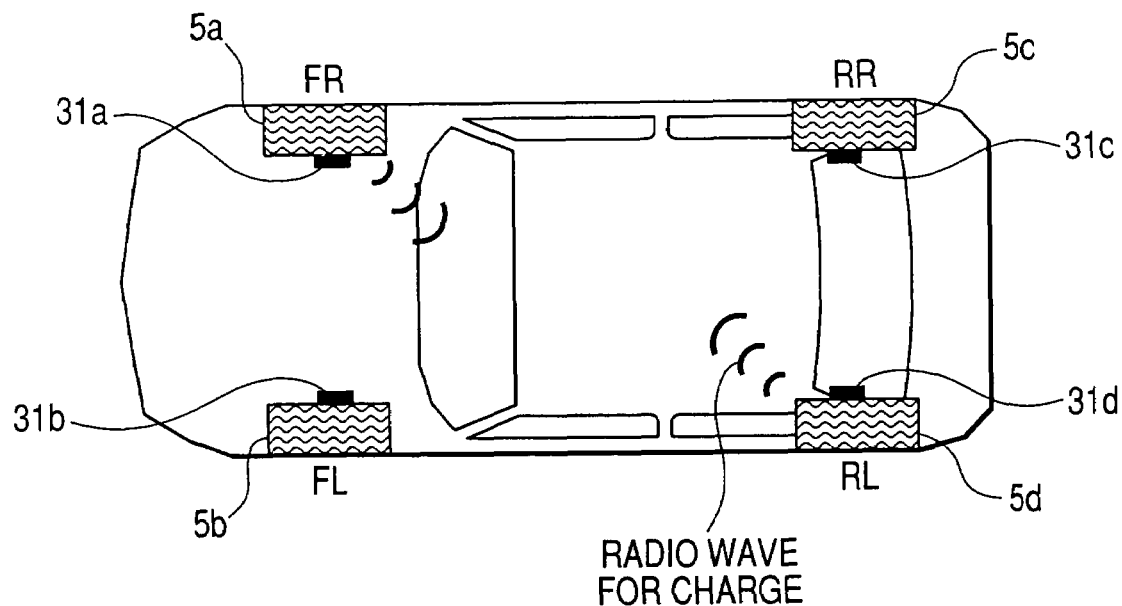
FIGS. 6A and 6B are schematic views illustrating transmission of the radio waves under the control according to the first embodiment of the invention.
Figure 6B:
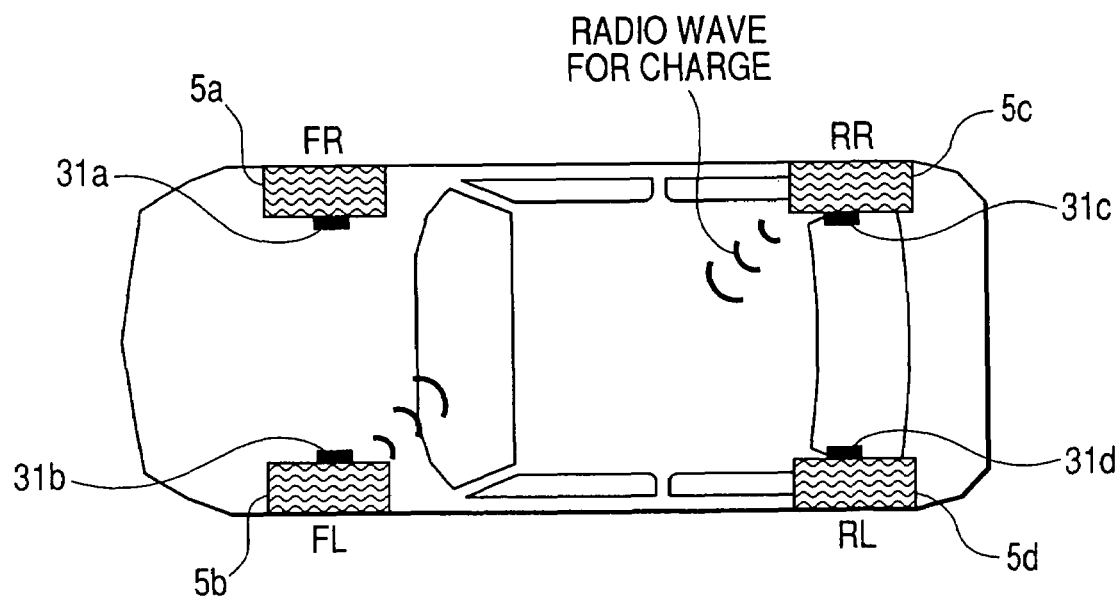

For example, during the first time period shown in FIG. 5, only two of the radio waves are transmitted through the FR and RL antennas 31a and 31d, as illustrated in FIG. 6A. On the contrary, during the succeeding second time period, only the other two radio waves are transmitted through the FL and RR antennas 31b and 31c, as illustrated in FIG. 6B.

Thus, the ON and OFF periods of the radio wave transmitted through the FR antenna 31a completely overlap with those of the radio wave transmitted through the RL antenna 31d. Similarly, the ON and OFF periods of the radio wave transmitted through the FL antenna 31b completely overlap with those of the radio wave transmitted through the RR antenna 31c.

Further, the ON periods of the radio waves transmitted through the FR and RL antennas 31a and 31d do not overlap with those of the radio waves transmitted through the FL and RR antennas 31b and 31c. Furthermore, there are no time intervals between the ON periods of the radio waves transmitted through the FR and RL antennas 31a and 31d and the succeeding ON periods of the radio waves transmitted through the FL and RR antennas 31b and 31c.

Figure 7:
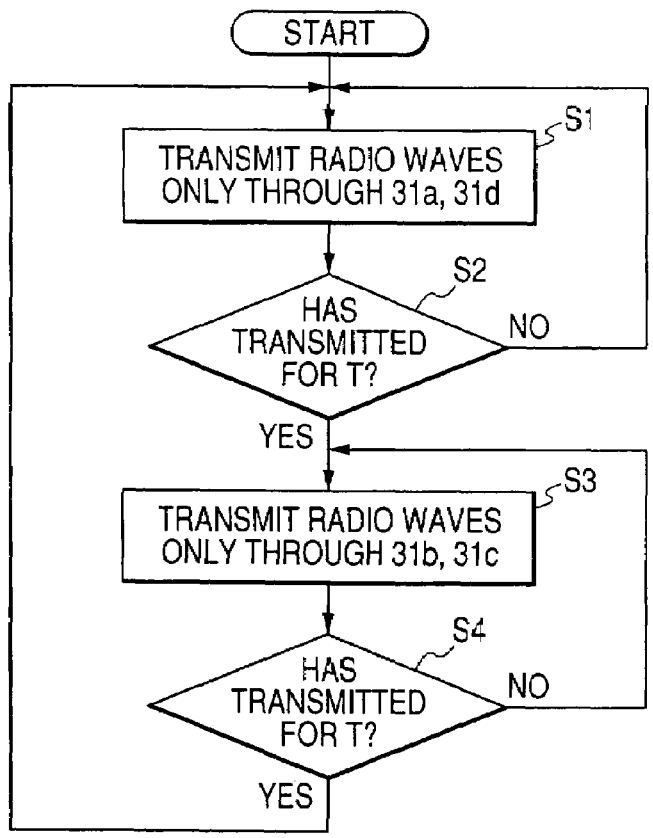
FIG. 7 is a flow chart showing a process of the body-side transceiver for transmitting the radio waves under the control according to the first embodiment of the invention.

FIG. 7 shows a process of the controlling unit 32b of the body-side transceiver 3 for controlling transmission of the radio waves. This process is, for example, started when an ignition switch (not shown) of the vehicle 1 is turned from OFF to ON, and terminated when the ignition switch is turned from ON to OFF.

First, at the step S1, the controlling unit 32b controls the transmitting/receiving unit 32a to transmit only two of the radio waves respectively through the FR and RL antennas 31a and 31d.

At the step S2, the controlling unit 32b determines whether the two radio waves have been transmitted for a predetermined time period T.

It should be noted that T here represents the length of "ON" periods of the radio waves shown in FIG. 5.

If the determination at the step S2 produces a "NO" answer, then the process returns to the step S1.

Otherwise, if the determination at the step S2 produces a "YES" answer, then the process proceeds to the step S3.

At the step S3, the controlling unit 32b controls the transmitting/receiving unit 32a to transmit only the other two radio waves respectively through the FR and RL antennas 31a and 31d. In other words, the transmission of the radio waves through the FR and RL antennas 31a and 31d is stopped at this step.

At the step S4, the controlling unit 32b determines whether the two radio waves have been transmitted through the FR and RL antennas 31a and 31d for the predetermined time period T.

If the determination at the step S4 produces a "NO" answer, then the process returns to the step S3.

Otherwise, if the determination at the step S4 produces a "YES" answer, then the process returns to repeat the above steps S1-S4.

As above, in the present embodiment, the radio wave passing through the FR antenna 31a is not simultaneously transmitted with the radio wave passing through the FL antenna 31b which is closest to the FR wheel 31a among other antennas. Further, the radio wave passing through the FR antenna 31a is also not simultaneously transmitted with the radio wave passing through the RR antenna 31c which is second closest to the FR wheel 31a. Consequently, in the areas A and C, there are no the radio waves intersecting and interfering with each other.

Similarly, the radio wave passing through the RL antenna 31d is not simultaneously transmitted with the radio wave passing through the RR antenna 31c which is closest to the RL wheel 31d among other antennas. Further, the radio wave passing through the RL antenna 31d is also not simultaneously transmitted with the radio wave passing through the FL antenna 31b which is second closest to the RL wheel 31d. Consequently, in the areas B and D, there are also no the radio waves intersecting and interfering with each other.

In addition, it should be noted again that at the predetermined strength, the radio waves transmitted through any diagonally disposed pair of the antennas, such as the pair of 31a and 31d and the pair of 31b and 31c, will never interest.

As a result, it becomes possible to reliably prevent the radio waves from interfering with each other to produce strong noises to exert undesirable influences on automotive devices provided on the vehicle 1.

Second Embodiment

This embodiment illustrates a control of transmission of the radio waves for electric power charge which is different from that of the previous embodiment.

As described previously, in the first embodiment, there are no time intervals between the ON periods of the radio waves transmitted through the FR and RL antennas 31a and 31d and the succeeding ON periods of the radio waves transmitted through the FL and RR antennas 31b and 31c. In other words, the end times of the ON periods of the radio waves transmitted through the FR and RL antennas 31a and 31d exactly coincide with the start times of the succeeding ON periods of the radio waves transmitted through the FL and RR antennas 31b and 31c.

Figure 8:
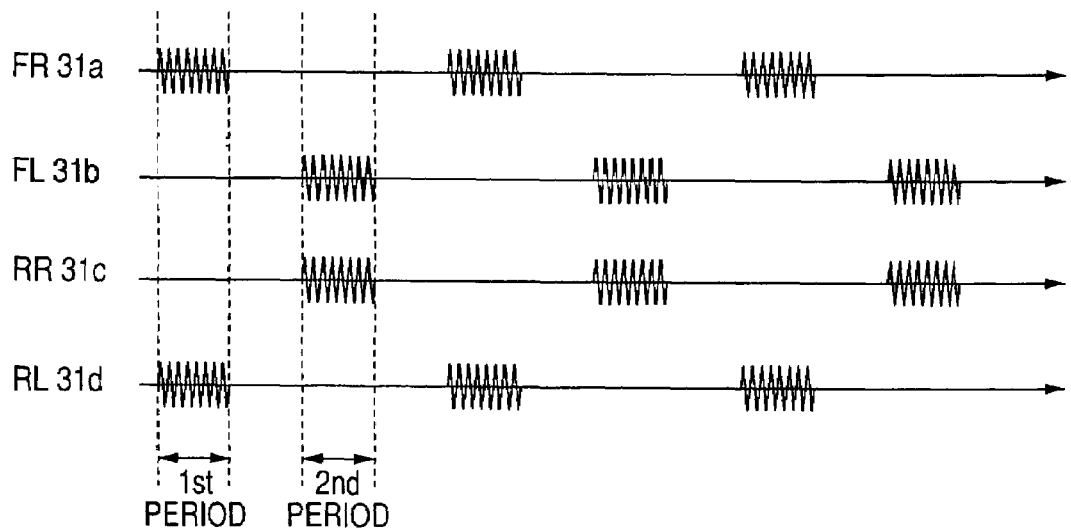
FIG. 8 is a time chart illustrating a control of transmission of the radio waves according to the second embodiment of the invention.

In comparison, referring to FIG. 8, in the present embodiment, there are provided time intervals between the ON periods of the radio waves transmitted through the FR and RL antennas 31a and 31d and the succeeding ON periods of the radio waves transmitted through the FL and RR antennas 31b and 31c.

For example, in FIG. 8, the start times of the first and second time periods are unchanged compared to the first embodiment; however, the lengths of the first and second time periods are shortened. As a result, between the first and second time periods, there is produced a time interval during which none of the radio waves is transmitted. Further, the time interval is shorter than the first and second time periods.

With such time intervals, compared to the first embodiment, it is possible to further reliably prevent the radio waves from interfering with each other to produce strong noises.

In addition, it should be noted that the time intervals may be equal to or longer than the ON periods of the radio waves.

Third Embodiment

This embodiment illustrates a control of transmission of the radio waves for electric power charge which is different from those of the previous embodiments.

As described previously, in the first and second embodiments, the ON periods of the radio waves transmitted through the FR and RL antennas 31a and 31d do not overlap with those of the radio waves transmitted through the FL and RR antennas 31b and 31c.

In comparison, referring to FIG. 9, in the present embodiment, the ON periods of the radio waves transmitted through the FR and RL antennas 31a and 31d partially overlap with those of the radio waves transmitted through the FL and RR antennas 31b and 31c.

In this case, during the overlapping part of the ON periods, the radio waves intersect in the areas A-D shown in FIG. 4, and the resultant waves thereof may become noises for automotive devices disposed on those area.

However, compared to the case where the ON periods of the radio waves transmitted through the FR and RL antennas 31a and 31d completely overlap with those of the radio waves transmitted through the FL and RR antennas 31b and 31c, it is possible to reduce undesirable influences on the automotive devices.

Fourth Embodiment

This embodiment illustrates a control of transmission of the radio waves for electric power charge which is different from that of the first embodiment.

Compared to the first embodiment, referring to FIG. 10, in the present embodiment, the arrangement of ON and OFF periods of the radio wave transmitted through the FL antenna 31b and that of the radio wave transmitted through the RL antenna 31d are counterchanged.

In this case, the radio waves transmitted by any pair of the antennas having the same front/rear position, such as the pair of the front antennas 31a and 31b and the pair of the rear antennas 31c and 31d, will intersect in either of the areas A and B.

However, the radio waves transmitted by any pair of the antennas having the same right/left position, such as the pair of the right antennas 31a and 31c and the pair of the left antennas 31d and 31d, will never interest.

Consequently, it is still possible to prevent the radio waves from producing strong noises in the areas C and D to exert undesirable influences on automotive devices provided on those areas.

In addition, as in the second embodiment, it is possible to provide time intervals between the ON periods of the radio waves transmitted through the front antennas 31a and 31b and the succeeding ON periods of the radio waves transmitted through the rear antennas 31c and 31d. Moreover, as in the third embodiment, it is also possible to partially overlap the ON periods of the radio waves transmitted through the front antennas 31a and 31b with those of the radio waves transmitted through the rear antennas 31c and 31d.

Fifth Embodiment

This embodiment illustrates a control of transmission of the radio waves for electric power charge which is different from that of the first embodiment.

As described previously, in the first embodiment, the ON periods of each of the radio waves overlap with those of only one of the other radio waves.

In comparison, referring to FIG. 11, in the present embodiment, the ON periods of each of the radio waves does not overlap with those of any other radio waves.

For example, in FIG. 11, the radio waves are transmitted through the antennas 31a, 31b, 31c, and 31d during the first, second, third, and fourth time periods, respectively.

With the above control, it is possible to reliably prevent, in any of the areas A-D, the radio waves from interfering with each other to produce strong noises.

Further, unlike in the first embodiment, the radio waves transmitted through any diagonally disposed pair of the antennas, such as the pair of 31a and 31d and the pair of 31b and 31c, will never intersect regardless of the strength at which they are transmitted. However, compared to the first embodiment, the time required for completion of charges for the wheel-side transceiver 2 is doubled.

In addition, as in the second embodiment, it is possible to provide time intervals between the ON periods of each of the radio waves and the succeeding ON periods of another of the radio waves. Moreover, as in the third embodiment, it is also possible to partially overlap the ON periods of each of the radio waves with those of another of the radio waves.

Sixth Embodiment

This embodiment illustrates a control of transmission of the radio waves for electric power charge which is different from that of the first embodiment.

As described previously, in the first embodiment, there are always two of the radio waves simultaneously transmitted.

In comparison, in the present embodiment, the controlling unit 32b controls transmission of the radio waves such that there are always three of the radio waves simultaneously transmitted.

For example, in FIG. 12, during the first time period, a first trio of the radio waves are transmitted respectively through the FR, RR, and RL antennas 31a, 31b, and 31c; during the second time period, a second trio of the radio waves are transmitted respectively through the FR, FL, and RL antennas 31a, 31b, and 31d; during the third time period, a third trio of the radio waves are transmitted respectively through the FR, FL, and RR antennas 31a, 31b, and 31c; during the fourth time period, a fourth trio of the radio waves are transmitted respectively through the FL, RR, and RL antennas 31b, 31c, and 31d.

In this case, since there is always one of the radio waves kept from being transmitted, there is accordingly always one of the areas A-D in which no the radio waves intersecting.

Accordingly, compared to the case where all of the radio waves are always simultaneously transmitted, it is possible to reduce undesirable influences of the radio waves on automotive devices provided on the vehicle 1.

Seventh Embodiment

This embodiment illustrates a process of the controlling unit 32b of the body-side transceiver 3 for preventing the radio waves for electric power charge from interfering with external radio waves from other vehicles.

Specifically, when there is a vehicle in the vicinity of the vehicle 1 and the vehicle is also equipped with a tire inflation pressure detecting apparatus identical to the tire inflation pressure detecting apparatus S1, the radio waves transmitted from the vehicle may interfere with the radio waves transmitted through the antennas 31a-31d.

Accordingly, to prevent interference of the radio waves with external radio waves, in the present embodiment, the controlling unit 32b first determines whether either of the antennas 31a-31d receives an external radio wave and permits the radio waves to be transmitted only when no external radio wave is received by either of the antennas 31a-31d.

Figure 13:
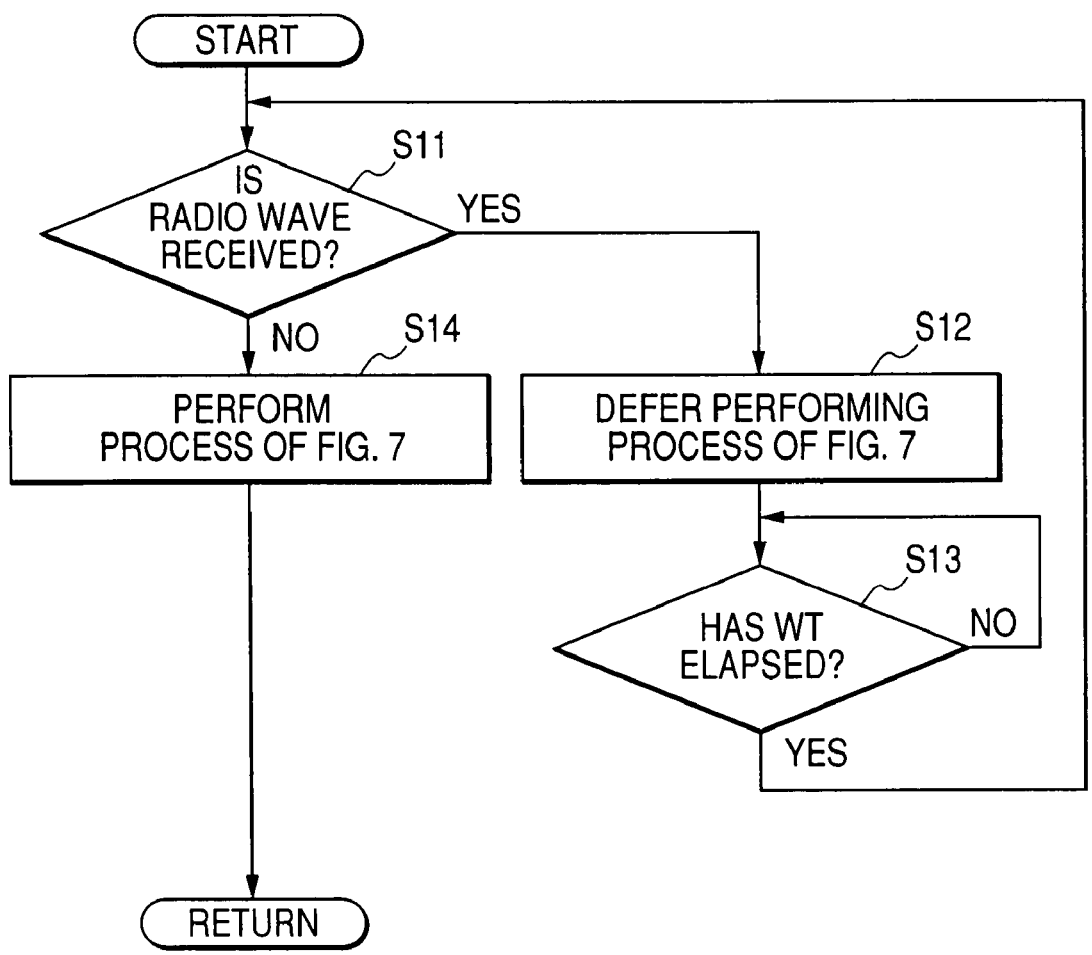
FIG. 13 is a flow chart showing a process of the body-side transceiver for transmitting the radio waves under a control according to the seventh embodiment of the invention.

FIG. 13 shows such a process of the controlling unit 32b, which includes therein the process shown in FIG. 7 and described in the first embodiment.

First, at the step S11, the controlling unit 32b determines whether a radio wave is received through either of the antennas 31a-31d.

If the determination at the step S11 produces a "YES" answer, in other words, if either of the antennas 31a-31d receives an external radio wave from another vehicle, then the process proceeds to the step S12.

At the step S12, the controlling unit 32b deters performing the process shown in FIG. 7. At the succeeding step S13, the controlling unit 32b waits a predetermined time WT, and then returns the process to the step S11.

On the other hand, if the determination at the step S11 produces a "NO" answer, then the process goes to the step S14.

At the step S14, the controlling unit 32b performs the process shown in FIG. 7, and then terminates the process.

Through performing the above process, it is possible to inhibit the radio waves from being transmitted simultaneously with any external radio waves, thereby reliably preventing interference between the radio waves and any external radio waves.

In addition, it is also possible to combine the above process with either of the controls of transmission of the radio waves according to the second to sixth embodiments through necessary modification.

For example, the above process may be modified in combination with the control according to the second embodiment such that the step S11 is performed once in each of the time intervals between the ON periods of the radio waves. More specifically, referring again to FIG. 8, during the time intervals before the ON periods of the two radio waves transmitted through the FL and RR antennas 31b and 31c, the step S11 is performed to determine whether an external radio wave is received through either of the antennas 31b and 31c. If it is not, then the two radio waves are respectively transmitted through the antennas 31b and 31c. Similarly, during the time intervals before the ON periods of the two radio waves transmitted through the FR and RL wheels 31a and 31d, the step S11 is performed to determine whether an external radio wave is received through either of the antennas 31a and 31d. If it is not, then the two radio waves are respectively transmitted through the antennas 31a and 31d.

Eighth Embodiment

This embodiment illustrates a control of transmission of the radio waves for electric power charge which is different from those of the previous embodiments.

As described previously, in the first to seventh embodiments, at least two of the radio waves are transmitted at different times through the corresponding ones of the antennas 31a-31d.

Figure 14A:
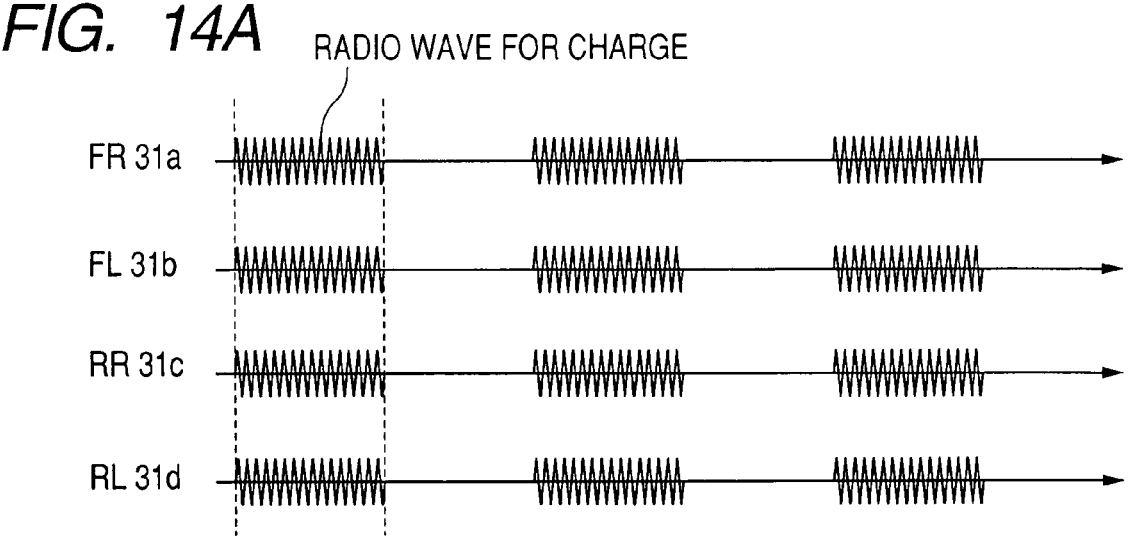
FIG. 14A is a time chart illustrating a control of transmission of the radio waves according to the eighth embodiment of the invention.

In comparison, referring to FIG. 14A, in the present embodiment, all of the radio waves are transmitted at the same time through the corresponding ones of the antennas 31a-31d.

Consequently, in each of the areas A-D shown in FIG. 4, the corresponding pair of the radio waves as described in the first embodiment will intersect to produce a resultant wave.

Figure 14B:
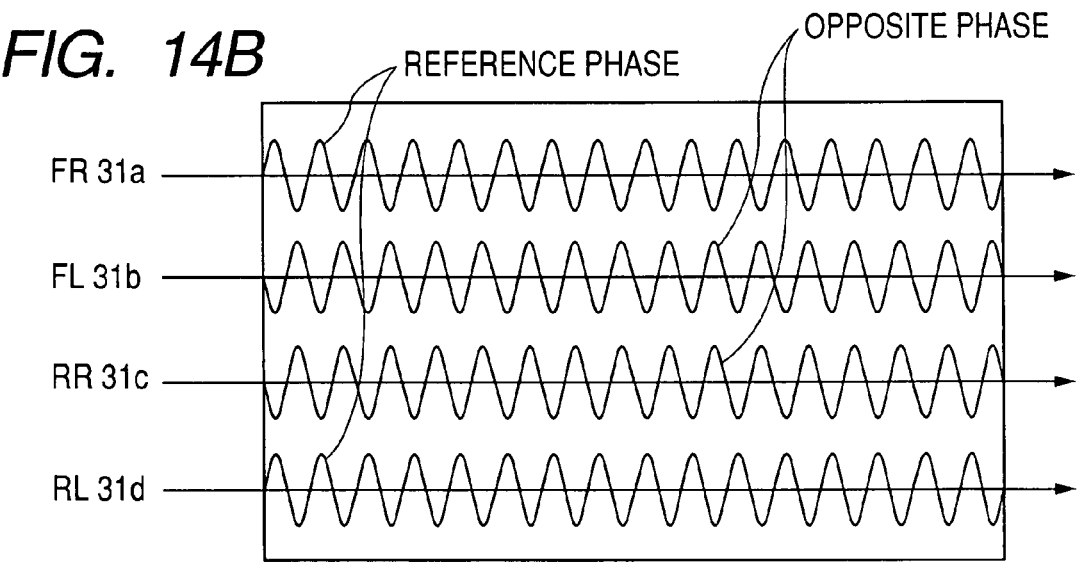
FIG. 14B is a wave form chart illustrating the control of transmission of the radio waves according to the eighth embodiment of the invention.

However, referring further to FIG. 14B, in the present embodiment, the radio waves transmitted through the FR and RL antennas 31a and 31d are different in phase from those transmitted through the FL and RR antennas 31b and 31c by ½λ, where λ is the wave length of the radio waves.

In other words, the radio waves transmitted by any pair of the antennas having the same front/rear position, such as the pair of the front antennas 31a and 31b and the pair of the rear antennas 31c and 31d, are opposite in phase to each other. Similarly, the radio waves transmitted by any pair of the antennas having the same right/left position, such as the pair of the right antennas 31a and 31c and the pair of the left antennas 31b and 31d, are also opposite in phase to each other.

Consequently, in each of the areas A-D, strength of the resultant wave will be lower than both strengths of the parent radio waves; in ideal cases, the strength of the resultant wave will be zero. In addition, it should be noted again that at the predetermined strength as described in the first embodiment, the radio waves transmitted through any diagonally disposed pair of the antennas, such as the pair of 31a and 31d and the pair of 31b and 31c, will never interest.

Accordingly, with the above control according to the present embodiment, it is possible to prevent the radio waves from producing strong noises to exert undesirable influences on automotive devices provided on the vehicle 1.

Further, compared to the second embodiment, the time required for completion of charges for the wheel-side transceiver 2 is reduced by half.

In addition, it is also possible to achieve the above effects by setting the difference in phase between the radio waves transmitted through the FR and RL antennas 31a and 31d and those transmitted through the FL and RR antennas 31b and 31c to any other value in the range of (½λ, ¾λ).

Figure 15:
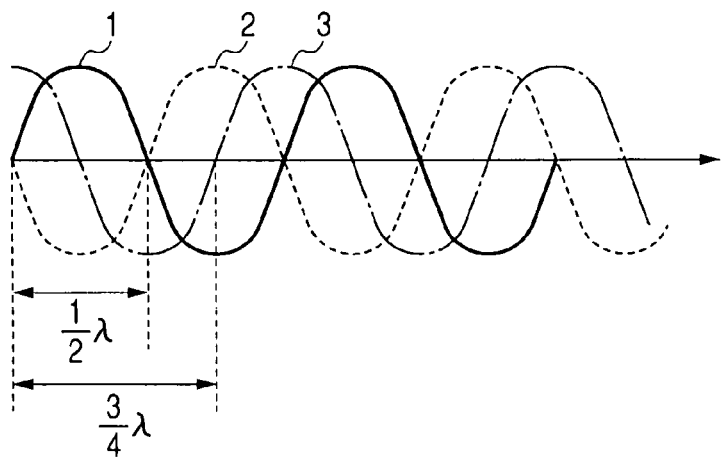
FIG. 15 is a wave form chart illustrating a preferable range of phase differences between the radio waves according to the eighth embodiment of the invention.

FIG. 15 illustrates the above range of phase difference. For example, in FIG. 15, the radio wave 1 represented by a continuous line and the radio wave 2 represented by a dashed line are opposite in phase to each other. In other words, the radio wave 2 lags behind the radio wave 1 in phase by ½λ. Moreover, the radio wave 3 represented by a chain line lags behind the radio wave 1 in phase by ¾λ.

Ninth Embodiment

This embodiment illustrates a control of transmission of the radio waves for electric power charge which is different from that of the eighth embodiment.

Figure 16:
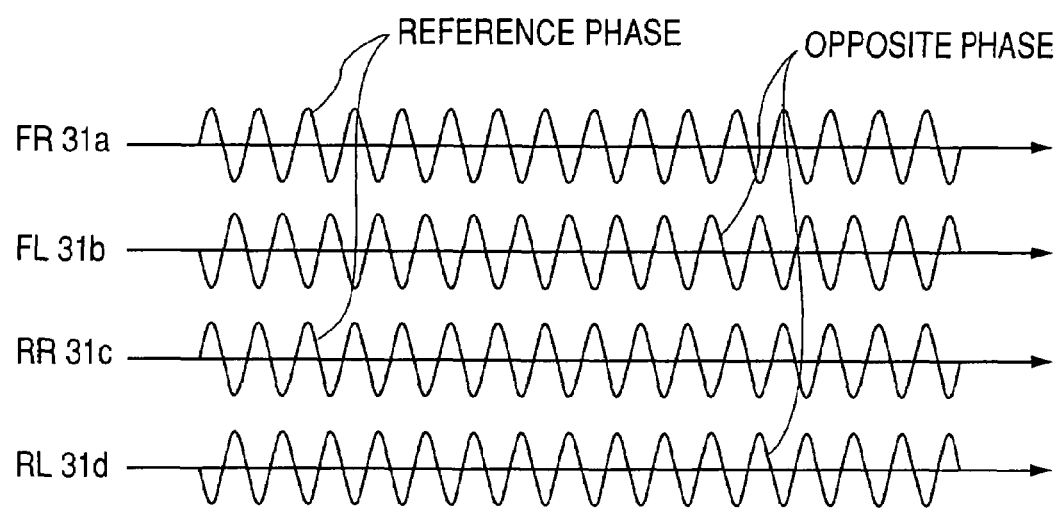
FIG. 16 is a wave form chart illustrating a control of transmission of the radio waves according to the ninth embodiment of the invention.

Compared to the eighth embodiment, referring to FIG. 16, in the present embodiment, the phase of the radio wave transmitted through the RR antenna 31c and that of the radio wave transmitted through the RL antenna 31d are counterchanged.

In this case, the radio waves transmitted by any pair of the antennas having the same front/rear position, such as the pair of the front antennas 31a and 31b and the pair of the rear antennas 31c and 31d, are opposite in phase to each other.

Consequently, it is possible to prevent the radio waves from producing strong noises in the areas A and B shown in FIG. 4.

In addition, as in the eighth embodiment, the difference in phase between the radio waves may be set to any other value in the range of (½λ, ¾λ).

Other Embodiments

While the above particular embodiments of the invention have been shown and described, it will be understood by those who practice the invention and those skilled in the art that various modifications, changes, and improvements may be made to the invention without departing from the spirit of the disclosed concept.

For example, it is possible to combine any of the controls according to the first to sixth embodiments with any of the controls according to the eighth and ninth embodiments.

Specifically, among the four radio waves transmitted respectively through the antennas 31a-31d, at least two of those may be transmitted at different times; further, at least two of the four radio waves may be transmitted at the same time but with a difference in phase therebetween in the range of ($\frac{1}{2}\lambda$, $\frac{3}{4}\lambda$).

For instance, during the first time period shown in FIG. 5, only two of the radio waves may be transmitted through the diagonally disposed pair of the FR and RL antennas 31a and 31d with a phase difference of $\frac{1}{2}\lambda$ therebetween. On the contrary, during the succeeding second time period, only the other two radio waves may be transmitted through the diagonally disposed pair of the FL and RR antennas 31b and 31c with a phase difference of $\frac{1}{2}\lambda$ therebetween.

With such a combined control, it is possible to achieve both the effects of the controls according to the first and eighth embodiments.

Moreover, in the previous embodiments, the number of wheels of the vehicle 1 and thus the number of the corresponding body-side antennas are equal to four.

However, it should be appreciated that the present invention is also applicable to any other cases where the number of vehicle wheels and the number of the corresponding body-side antennas are more or less than four.

Furthermore, though the present invention is directed to the tire inflation pressure detecting apparatus S1 in the previous embodiments, it should be understood that the present invention is applicable to any other wireless electric power charging systems for vehicles.

Such modifications, changes, and improvements within the skill of the art are intended to be covered by the appended claims.

What is claimed is:

1. A tire inflation pressure detecting apparatus comprising:
a plurality of antennas each of which is provided on a body of a vehicle at a predetermined distance from a corresponding one of a plurality of wheels of the vehicle;
a transmitter provided on the body of the vehicle and working to transmit a plurality of radio waves respectively through corresponding ones of the antennas;
a plurality of pressure sensors each of which is provided on a corresponding one of the wheels of the vehicle and works to sense inflation pressure of a tire fitted on the corresponding wheel;
a plurality of transceivers each of which is provided on a corresponding one of the wheels of the vehicle in connection with a corresponding one of the pressure sensors on the corresponding wheel, each of the transceivers working to receive a corresponding one of the radio waves transmitted through the corresponding antenna and transmit a pressure signal indicative of the inflation pressure sensed by the corresponding pressure sensor;
a plurality of charging units each of which is provided on a corresponding one of the wheels of the vehicle in connection with a corresponding one of the transceivers on the corresponding wheel, each of the charging units being configured to be charged with electric power, which is induced by the corresponding radio wave received by the corresponding transceiver, and supply the electric power to the corresponding pressure sensor and transceiver;
a receiver provided on the body of the vehicle and working to receive, through the corresponding antennas, the pressure signals transmitted by the transceivers;
a pressure determiner provided on the body of the vehicle in connection with the receiver, the pressure determiner working to determine the inflation pressures of the tires based on the corresponding pressure signals received by the receiver; and
a controller provided on the body of the vehicle and working to control the transmitter to transmit the radio waves through the corresponding antennas,
wherein at least two of the radio waves are transmitted at different times, so as to minimize interference therebetween, and
wherein at least one pair of the radio waves are transmitted at the same time with such a phase difference therebetween that when the pair of the radio waves intersect, strength of a resultant wave thereof is lower than both strengths of the pair of the radio waves.

2. The tire inflation pressure detecting apparatus as set forth in claim 1, wherein the at least two radio waves are transmitted for different non-overlapping time periods.

3. The tire inflation pressure detecting apparatus as set forth in claim 2, wherein there is a time interval between the non-overlapping time periods.

4. The tire inflation pressure detecting apparatus as set forth in claim 1, wherein two of the radio waves are transmitted at different times through the corresponding antennas the distance between which is minimum among all the distances between the antennas.

5. The tire inflation pressure detecting apparatus as set forth in claim 1, wherein the wheels of the vehicle include a front-right wheel, a front-left wheel, a rear-right wheel, and a rear-left wheel, and
wherein any pair of the radio waves, which are transmitted respectively through a pair of the antennas corresponding to a pair of the wheels having the same front/rear position, are transmitted at different times, and
any pair of the radio waves, which are transmitted respectively through a pair of the antennas corresponding to a pair of the wheels having the same right/left, are transmitted at different times.

6. The tire inflation pressure detecting apparatus as set forth in claim 1, wherein the controller controls the transmitter to transmit each of the radio waves through the corresponding antenna when no radio wave is received by the corresponding antenna.

7. The tire inflation pressure detecting apparatus as set forth in claim 1, wherein the corresponding pressure sensor, transceiver, and charging unit on each of the wheels of the vehicle are integrated into a single device, while the transmitter, receiver, pressure determiner, and controller on the body of the vehicle are integrated into a single device.

8. A tire inflation pressure detecting apparatus comprising:
a plurality of antennas each of which is provided on a body of a vehicle at a predetermined distance from a corresponding one of a plurality of wheels of the vehicle;
a transmitter provided on the body of the vehicle and working to transmit a plurality of radio waves respectively through corresponding ones of the antennas;
a plurality of pressure sensors each of which is provided on a corresponding one of the wheels of the vehicle and works to sense inflation pressure of a tire fitted on the corresponding wheel;

a plurality of transceivers each of which is provided on a corresponding one of the wheels of the vehicle in connection with a corresponding one of the pressure sensors on the corresponding wheel, each of the transceivers working to receive a corresponding one of the radio waves transmitted through the corresponding antenna and transmit a pressure signal indicative of the inflation pressure sensed by the corresponding pressure sensor;

a plurality of charging units each of which is provided on a corresponding one of the wheels of the vehicle in connection with a corresponding one of the transceivers on the corresponding wheel, each of the charging units being configured to be charged with electric power, which is induced by the corresponding radio wave received by the corresponding transceiver, and supply the electric power to the corresponding pressure sensor and transceiver;

a receiver provided on the body of the vehicle and working to receive, through the corresponding antennas, the pressure signals transmitted by the transceivers;

a pressure determiner provided on the body of the vehicle in connection with the receiver, the pressure determiner working to determine the inflation pressures of the tires based on the corresponding pressure signals received by the receiver; and a controller provided on the body of the vehicle and working to control the transmitter to transmit the radio waves through the corresponding antennas, wherein at least one pair of the radio waves are transmitted at the same time with such a phase difference therebetween that when the pair of the radio waves intersect, strength of a resultant wave thereof is lower than both strengths of the pair of the radio waves.

9. The tire inflation pressure detecting apparatus as set forth in claim 8, wherein the phase difference between the pair of the radio waves is in a range of ($1/2\lambda$, $3/4\lambda$), where $\lambda$ is a length of the radio waves.

10. The tire inflation pressure detecting apparatus as set forth in claim 8, wherein the wheels of the vehicle include a front-right wheel, a front-left wheel, a rear-right wheel, and a rear-left wheel, and wherein any pair of the radio waves, which are transmitted respectively through a pair of the antennas corresponding to a pair of the wheels having the same front/rear position, are opposite in phase to each other, and any pair of the radio waves, which are transmitted respectively through a pair of the antennas corresponding to a pair of the wheels having the same right/left position, are opposite in phase to each other.

11. The tire inflation pressure detecting apparatus as set forth in claim 8, wherein the corresponding pressure sensor, transceiver, and charging unit on each of the wheels of the vehicle are integrated into a single device, while the transmitter, receiver, pressure determiner, and controller on the body of the vehicle are integrated into a single device.

12. A wireless electric power charging system for use in a vehicle, comprising:

a first and a second antenna which are provided on a body of a vehicle at a predetermined distance respectively from a first and a second wheel of the vehicle;

a transmitter provided on the body of the vehicle and working to transmit a first and a second radio wave respectively through the first and second antennas;

a first and a second receiver which are respectively provided on the first and second wheels of the vehicle and work to receive the first and second radio waves respectively;

a first and a second charging unit which are respectively provided on the first and second wheels of the vehicle and configured to be charged with a first and a second electric power respectively, the first and second electric powers being respectively induced by the first and second radio waves received by the first and second receivers; and a controller controlling the transmitter to transmit the first and second radio waves with such a phase difference therebetween that when the first and second radio waves intersect, strength of a resultant wave of the first and second radio waves is lower than both strengths of the first and second radio waves.

13. The wireless electric power charging system as set forth in claim 12, wherein the phase difference between the first and second radio waves is in a range of ($1/2\lambda$, $3/4\lambda$), where $\lambda$ is a wave length of the first and second radio waves.

* * * * *